(12) United States Patent
Soupos et al.

(10) Patent No.: US 7,780,436 B2
(45) Date of Patent: Aug. 24, 2010

(54) FLEX-FLAME BURNER AND COMBUSTION METHOD

(75) Inventors: Vasilios Soupos, Chicago, IL (US); Serguei Zelepouga, Hoffman Estates, IL (US); David M. Rue, Chicago, IL (US); Hamid A. Abbasi, Naperville, IL (US)

(73) Assignee: Gas Technology Institute, Des Plaines, IL (US)

( * ) Notice: Subject to any disclaimer, the term of this patent is extended or adjusted under 35 U.S.C. 154(b) by 1205 days.

(21) Appl. No.: 11/141,765

(22) Filed: Jun. 1, 2005

(65) Prior Publication Data

US 2006/0272453 A1    Dec. 7, 2006

(51) Int. Cl.
*F23M 3/04* (2006.01)
(52) U.S. Cl. .......................... 431/10; 431/351
(58) Field of Classification Search ................ 431/350, 431/10, 351
See application file for complete search history.

(56) References Cited

U.S. PATENT DOCUMENTS

| 6,071,115 A | * | 6/2000 | Carbone et al. | ............. 431/350 |
| 6,074,197 A | * | 6/2000 | Philippe | ...................... 431/10 |

* cited by examiner

*Primary Examiner*—Roy King
*Assistant Examiner*—Weiping Zhu
(74) *Attorney, Agent, or Firm*—Mark E. Fejer

(57) ABSTRACT

A combustion method and apparatus which produce a hybrid flame for heating metals and metal alloys, which hybrid flame has the characteristic of having an oxidant-lean portion proximate the metal or metal alloy and having an oxidant-rich portion disposed above the oxidant lean portion. This hybrid flame is produced by introducing fuel and primary combustion oxidant into the furnace chamber containing the metal or metal alloy in a substoichiometric ratio to produce a fuel-rich flame and by introducing a secondary combustion oxidant into the furnace chamber above the fuel-rich flame in a manner whereby mixing of the secondary combustion oxidant with the fuel-rich flame is delayed for a portion of the length of the flame.

8 Claims, 13 Drawing Sheets

FLEX-FLAME BURNER AND COMBUSTION METHOD

The U.S. Government has a paid-up license in this invention and the right in limited circumstances to require the patent owner to license others on reasonable terms as provided for by the terms of Contract No. DE-FC36-01ID13903 awarded by the U.S. Department of Energy.

BACKGROUND OF THE INVENTION

Field of the Invention

This invention relates to a method and apparatus for heating metals and metal alloys in high temperature furnaces. More particularly, this invention relates to a method and apparatus for heating metals and metal alloys which produces reduced metal oxidation and lower $NO_x$ emissions compared with conventional burners and combustion methods. The method of this invention may be installed as either a new or retrofit application, and under some circumstances, may be used with new burners or existing burners on a furnace without the need for burner replacement.

Description of Related Art

The aluminum industry is a major consumer of natural gas in the industrial sector. Aluminum is produced by the electrochemical reduction of aluminum oxide (primary production) and by the melting of scrap and recycled aluminum (secondary production). Secondary aluminum processing requires only 8 percent as much energy as primary production. Over 45 percent of U.S. aluminum, 3.2 million tons/year, comes from secondary production. When aluminum scrap is melted for reuse, the oxygen in the furnace combines with some of the aluminum to form a layer of aluminum oxide dross. Some of the dross is sent to landfills and some is recovered as aluminum through processes that use large amounts of electrical energy, similar to primary aluminum production processes. Both of these dispositions have environmental and energy use liabilities. The dross represents a significant inefficiency in aluminum production. The inefficiency due to surface oxidation in aluminum melting and similar industrial processes could be reduced by flexible burner designs that would control the amount of oxygen in contact with work load surfaces by maintaining air-lean conditions near the surfaces.

Studies of metal oxidation have shown that oxidation formation is a function of the oxygen level in the vicinity of the metal, temperature, and residence time of the metal being heated in the furnace chamber. Accordingly, oxidation formation can be reduced by lowering the oxygen level in the vicinity of the metal, lowering the temperature of the flame heating the metal, and lowering the residence time of the metal in the furnace chamber.

High momentum flames are employed in aluminum melting furnaces. High momentum jets are relied upon to provide convective heating in these furnaces because molten aluminum surfaces are highly reflective and poorly heated by radiant heat transfer. High momentum jets are known to mix rapidly, and staging of the combustion process is generally difficult to achieve.

Metal melting operations are generally conducted on either a continuous or a semi-batch "cycle" basis. The semi-batch processes involve charging solids to a melter, melting the feed materials, adjusting the combustion to reach a desired composition, tapping the molten metal into ingots or sows, and then starting over again. During a semi-batch melting process, there are periods in which the high momentum burners must be operated at full fire, and other periods in which they must be operated at very low fire. At low fire, the flame characteristics, flame velocity, and air/fuel ratio often change dramatically, resulting in inefficient burner operation.

SUMMARY OF THE INVENTION

It is, thus, one object of this invention to provide a combustion method and apparatus for heating metals and metal alloys which reduces the amount of metal oxidation occurring during the heating process compared to conventional combustion methods and systems.

It is one object of this invention to provide a method and apparatus for heating metals and metal alloys which address the inefficiencies of low-fire operation of conventional methods and apparatuses.

It is another object of this invention to provide a method and apparatus for heating metals and metal alloys employing high momentum burners and staging of the combustion process.

These and other objects of this invention are addressed by a combustion method and apparatus which produce a hybrid flame for heating metals and metal alloys, said hybrid flame having the characteristic of having a fuel-rich portion proximate the metal or metal alloy and having a fuel-lean portion disposed above the fuel-rich portion. This hybrid flame is produced by introducing fuel and primary combustion oxidant into the furnace chamber containing the metal or metal alloy in a substoichiometric ratio to produce a fuel-rich flame and introducing a secondary combustion oxidant into the furnace chamber above the fuel-rich flame in a manner whereby mixing of the secondary combustion oxidant with the fuel-rich flame is delayed for a portion of the length of the flame. The result is a flame in which the upper portion thereof, that is the portion distal from the metal or metal alloy being heated, is fuel-lean and the lower portion thereof, that is the portion disposed proximate to the metal or metal alloy being heated, is fuel-rich. The amount of secondary combustion oxidant introduced into the furnace chamber is at least sufficient to ensure complete combustion of the fuel within the furnace chamber.

BRIEF DESCRIPTION OF THE DRAWINGS

These and other objects and features of this invention will be better understood from the following detailed description taken in conjunction with the drawings, wherein.

DETAILED DESCRIPTION OF PRESENTLY PREFERRED EMBODIMENTS

Figure 1:
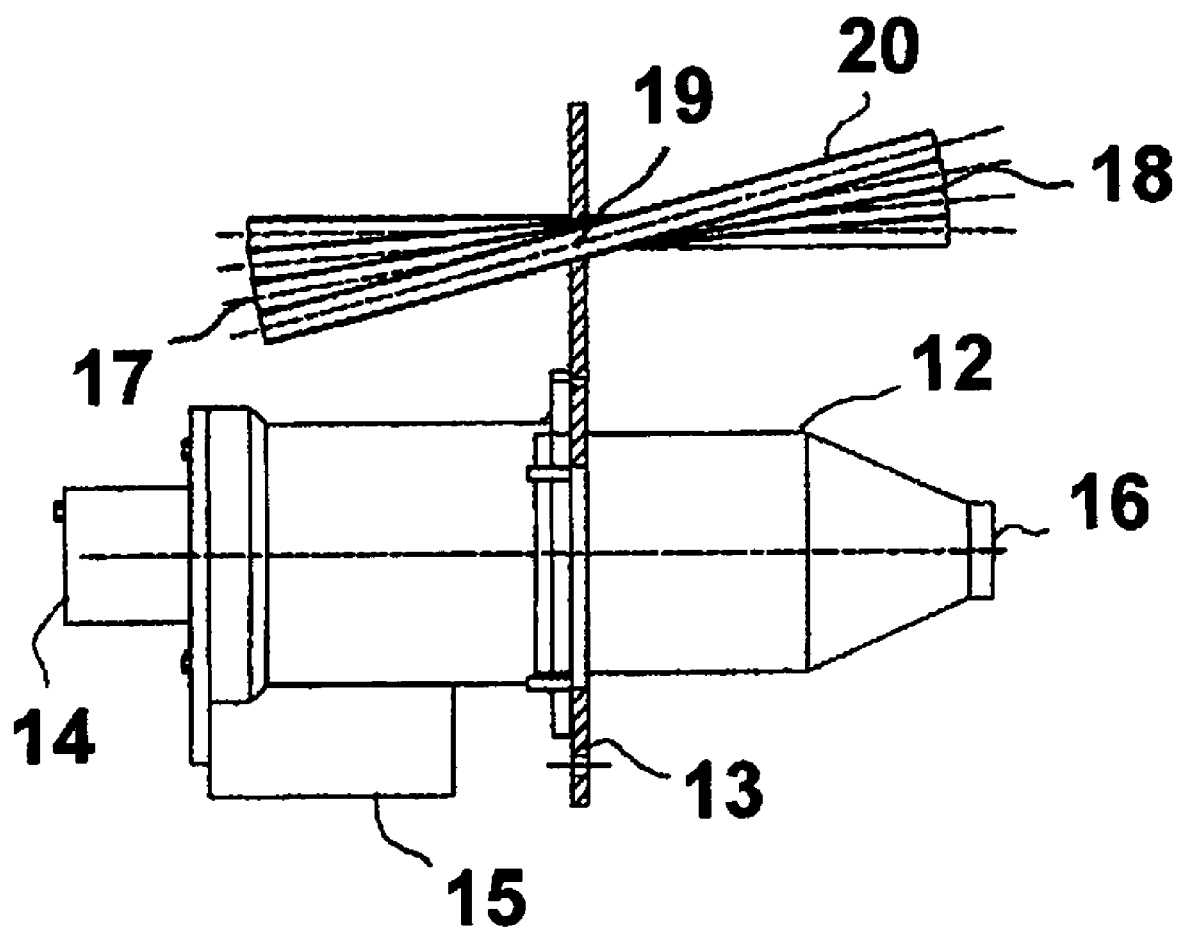
FIG. 1 is lateral view of a burner system for implementing the method of this invention.

It should be noted that the invention disclosed and claimed herein is equally applicable to both metals and metal alloys. Thus, for the purpose of clarity, it is to be understood that, wherever the term "metal" is used by itself in the description and claims, the term "metal alloy" could be substituted therefor. It should also be noted that the term "oxidant" refers to any oxygen-containing fluid from which the oxygen can be used for combustion of the fuel employed in the method of the invention, primarily air, oxygen and oxygen-enriched air.

As used herein, the term "fuel-rich" refers to a condition in which the amount of oxygen present in a region of combustion, i.e. a combustion zone or flame, is insufficient to provide complete combustion of the fuel in the region of combustion. The mere fact that unused oxygen is determined by measurement or otherwise to be present in the region of combustion does not mean that the region is not fuel-rich. Likewise, as used herein, the term "fuel-lean" refers to a condition in which the amount of oxygen present in a region of combustion is sufficient to provide complete combustion of the fuel in the region of combustion. The mere fact that unburned fuel is determined by measurement or otherwise to be present in the region of combustion does not mean that the region is not fuel-lean.

The invention disclosed and claimed herein is a method and apparatus for creating a hybrid flame within a metal heating or metal melting furnace. This hybrid flame is characterized by a fuel-rich region in the flame that is proximate to the metal being heated or melted, generally in the lower portion of the flame, and a fuel-lean region in the upper portion of the flame, generally distal from the metal being heated or melted. Such a flame is created in accordance with the method of this invention by staging the combustion of the fuel. In particular, a portion of the combustion oxidant required for complete combustion of the fuel is diverted to one or more secondary nozzles separate and apart from the one or more primary nozzles through which the fuel is introduced into the furnace. The one or more secondary nozzles are arranged above the one or more primary nozzles to introduce a portion of the oxidant required for complete combustion of the fuel, referred to herein as "secondary combustion oxidant," above and in the same direction as the flame at an angle in the range of about −10° to about +15° from a horizontal. By diverting a portion of the combustion oxidant required for complete combustion of the fuel to the secondary nozzles and introducing it above the flame, the one or more primary fuel nozzles fire fuel-rich while the overall stoichiometry of the system remains unchanged. The secondary combustion oxidant stream may be preheated or non-preheated, but it must be injected into the furnace chamber at a velocity either comparable to the exit velocity of the flame or sufficiently high to allow for delayed mixing of the secondary combustion oxidant with the hot gases of the flame.

Figure 2:
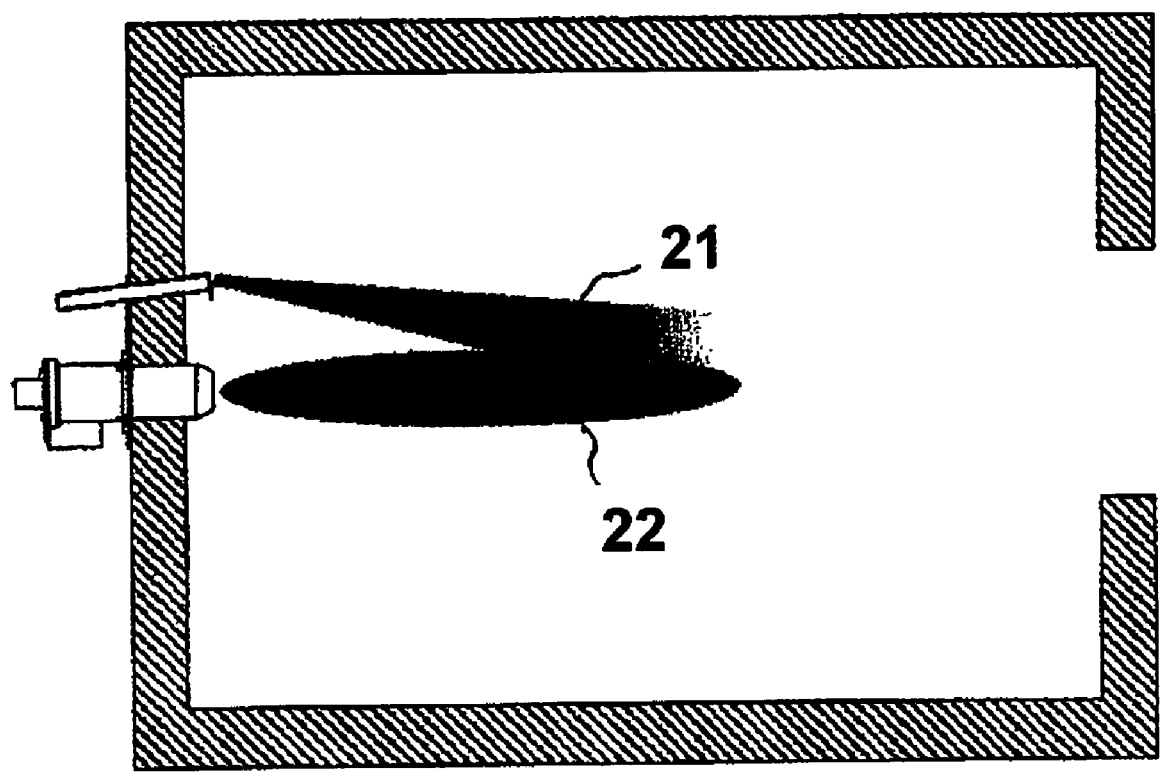
FIG. 2 is a diagram showing the method of introducing the secondary combustion oxidant into a metal heating furnace.

FIG. 1 is a lateral view of a combustion system suitable for implementation of the method of this invention. As shown therein, fuel nozzle 12 having a fuel inlet 14, an oxidant inlet 15 and a fuel/oxidant outlet 16 is secured to wall 13 of a furnace chamber. Disposed above fuel nozzle 12 is a secondary combustion oxidant nozzle 20 having a secondary combustion oxidant inlet 17 and a secondary combustion oxidant outlet 18. Secondary combustion oxidant nozzle 20 is vertically pivotable around a pivot point 19, whereby the vertical angle at which the secondary combustion oxidant is introduced into the furnace may be varied. In accordance with one preferred embodiment of this invention, secondary combustion oxidant nozzle 20 is pivotable to an angle within the range of about −10° to +15° below and above a horizontal, respectively. In accordance with a particularly preferred embodiment of this invention, secondary combustion oxidant nozzle 20 is pivotable to an angle in the range of about 0° to about +10°. The effect of angling secondary combustion oxidant nozzle 20 up to about 10° above a horizontal as shown in FIG. 2 is to delay mixing of the secondary combustion oxidant 21 with the flame 22. Even though the angle of injection is directed away from the flame, a low pressure regime created by the high velocity primary flame entrains the secondary combustion oxidant stream from the secondary combustion oxidant nozzle, eventually resulting in complete mixing of the primary flame and the secondary combustion oxidant.

Figure 3:
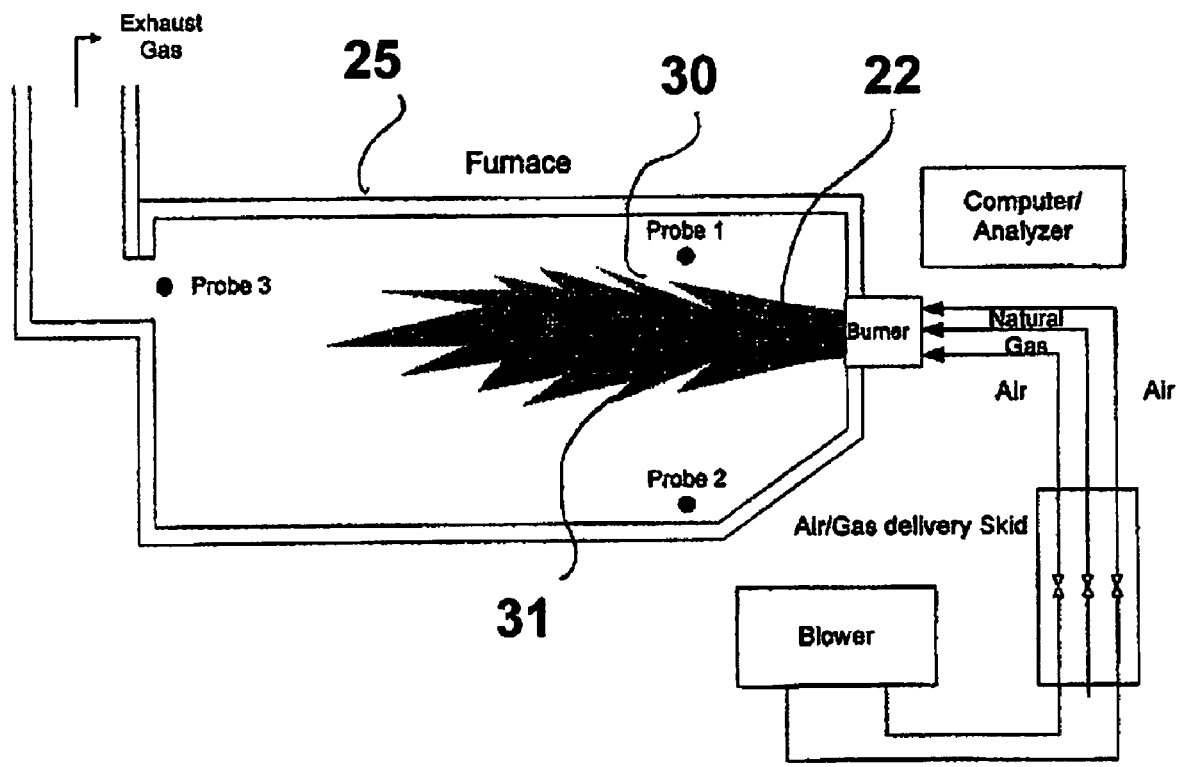
FIG. 3 is a diagram showing an experimental setup including probe positions for determining the characteristics of the flame produced in accordance with various embodiments of the method of this invention.

As previously indicated, the method and apparatus of this invention create a hybrid flame in the vertical direction by diverting some of the combustion oxidant required for complete combustion of the fuel from the burner to a single or multiple secondary combustion oxidant nozzles disposed vertically higher than the burner and oriented to deliver the secondary combustion oxidant into the furnace chamber substantially over the flame. The hybrid flame 22 is characterized by a gradient in the oxygen concentration, with lower oxygen concentration in the bottom portion 31 and higher oxygen concentration in the upper portion 30 as shown in FIG. 3. This gradation of oxygen concentration may be continuous, which occurs when using nozzle-mixed burners, or discontinuous, which occurs when using high momentum flames. Such a hybrid flame is obtained by staging the combustion of the fuel. That is, while a portion of the fuel is combusted proximate the burner, the remaining fuel mixes with over-fire oxidant, and combustion is completed within the furnace chamber. By staging the fuel combustion in this manner, the oxygen level in the vicinity of the heated or molten metal is reduced, and the flame temperature is decreased. Consequently, metal oxidation is decreased (and in the case of aluminum melting, dross formation is reduced); $NO_x$ emissions are reduced because peak flame temperature is decreased; and the flame footprint, i.e. coverage area, is increased, which improves convective heat transfer to the melt and decreases oxidation. Oxidation decreases because the process is exothermic and is most rapid at the highest temperature on the metal surface.

Figure 4:
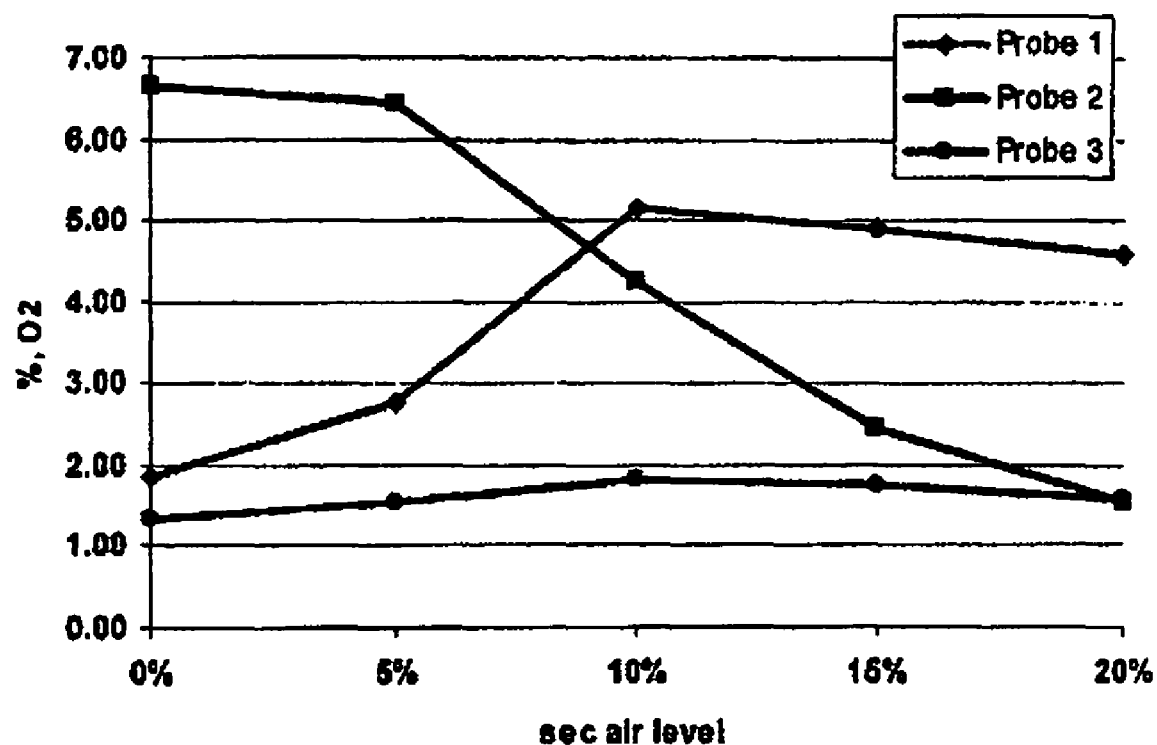
FIG. 4 is a diagram showing the oxygen content of the gases within a furnace chamber at the probe positions shown in FIG. 3 and at various amounts of secondary combustion oxidant resulting from implementation of one embodiment of the method of this invention.
Figure 5:
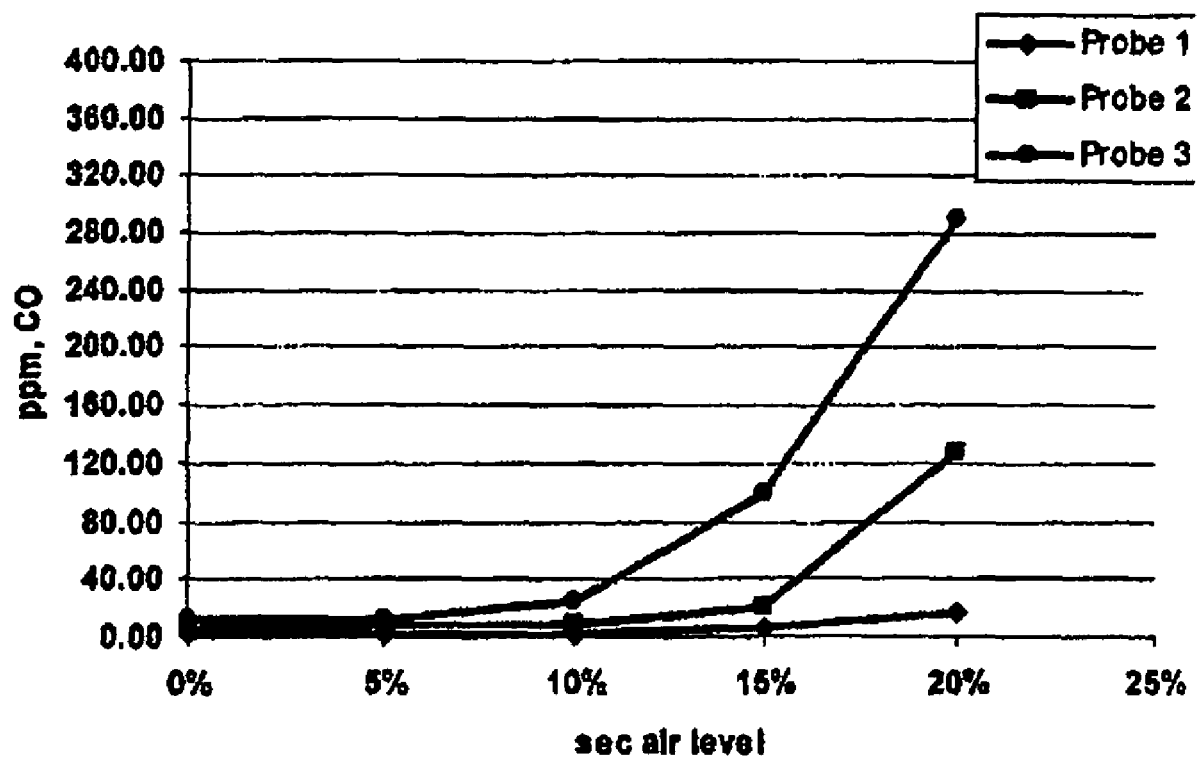
FIG. 5 is a diagram showing carbon monoxide content of the gases within a furnace chamber at the probe positions shown in FIG. 3 and at various amounts of secondary combustion oxidant resulting from implementation of one embodiment of the method of this invention.
Figure 6:
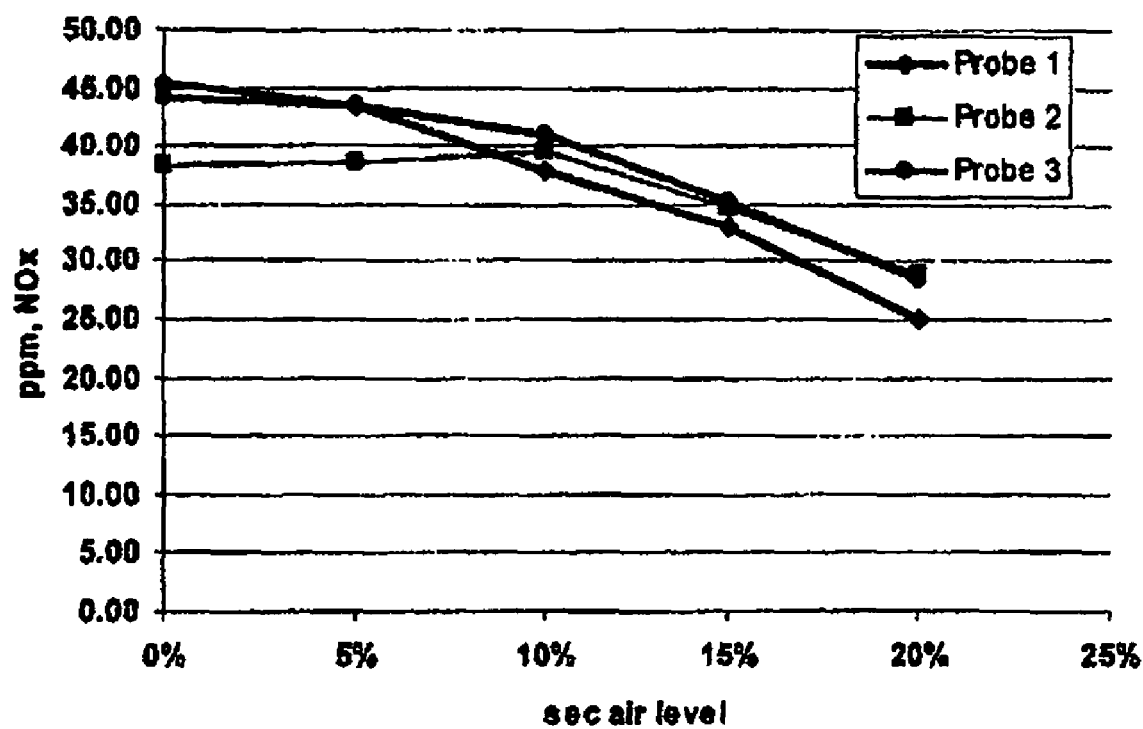
FIG. 6 is a diagram showing nitrogen oxides content of the gases within a furnace chamber at the probe positions shown in FIG. 3 and at various amounts of secondary combustion oxidant resulting from implementation of one embodiment of the method of this invention.
Figure 7:
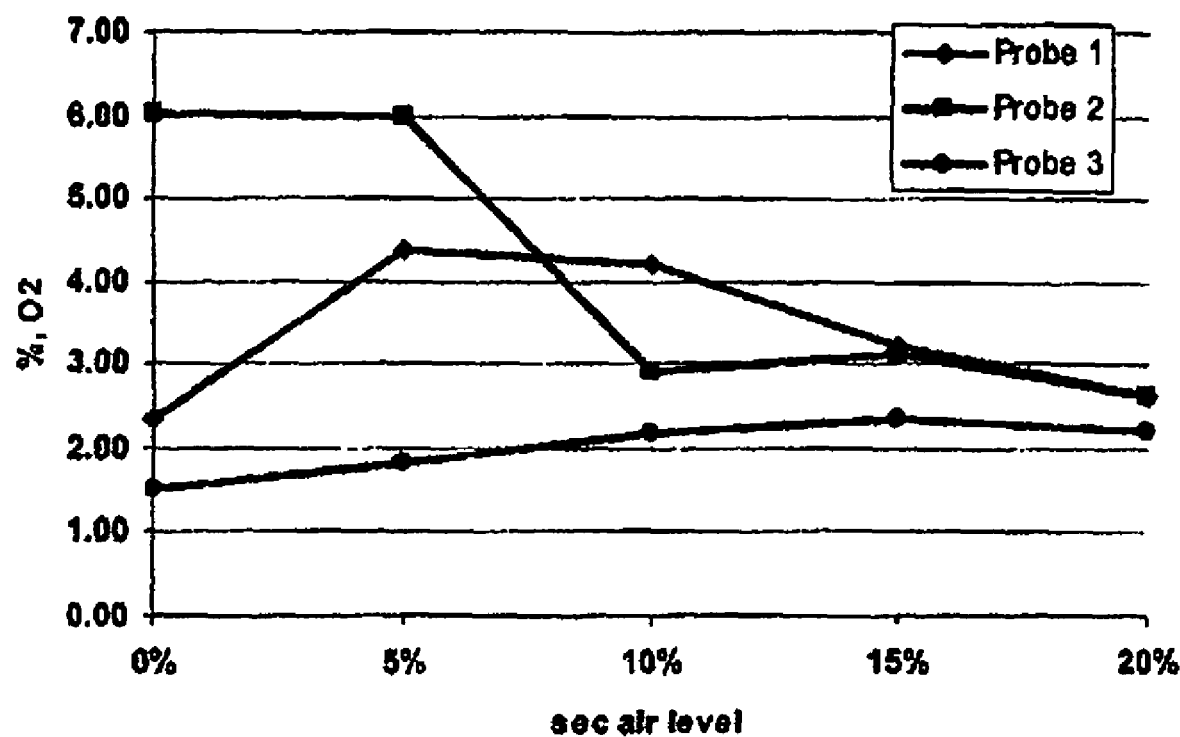
FIG. 7 is a diagram showing the oxygen content of the gases within a furnace chamber at the probe positions shown in FIG. 3 and at various amounts of secondary combustion oxidant resulting from implementation of a second embodiment of the method of this invention.
Figure 8:
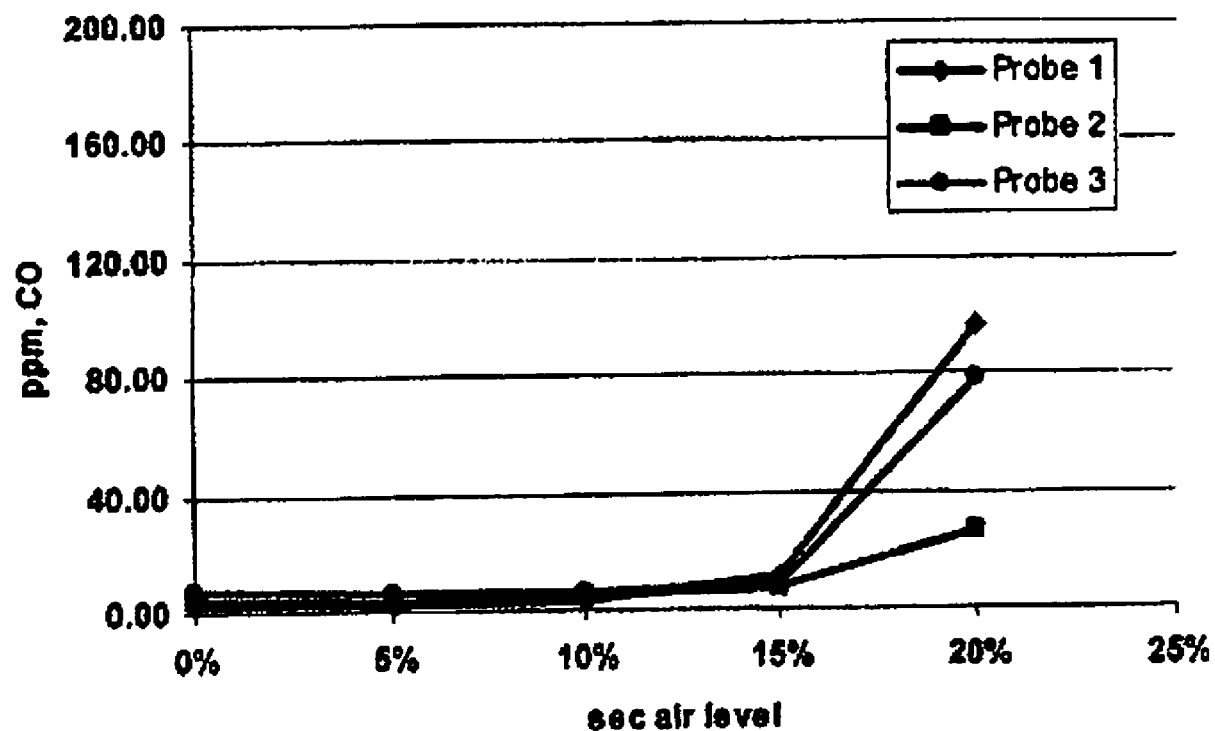
FIG. 8 is a diagram showing carbon monoxide content of the gases within a furnace chamber at the probe positions shown in FIG. 3 and at various amounts of secondary combustion oxidant resulting from implementation of a second embodiment of the method of this invention.
Figure 9:
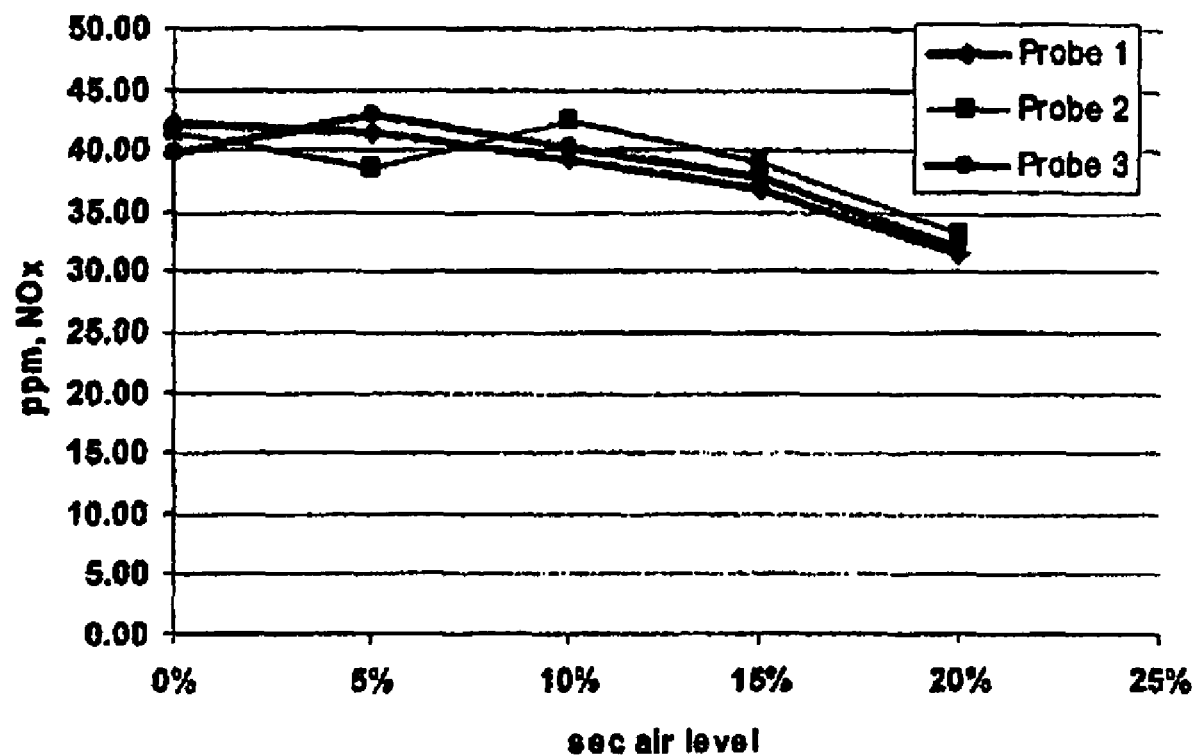
FIG. 9 is a diagram showing nitrogen oxides content of the gases within a furnace chamber at the probe positions shown in FIG. 3 and at various amounts of secondary combustion oxidant resulting from implementation of a second embodiment of the method of this invention.
Figure 10:
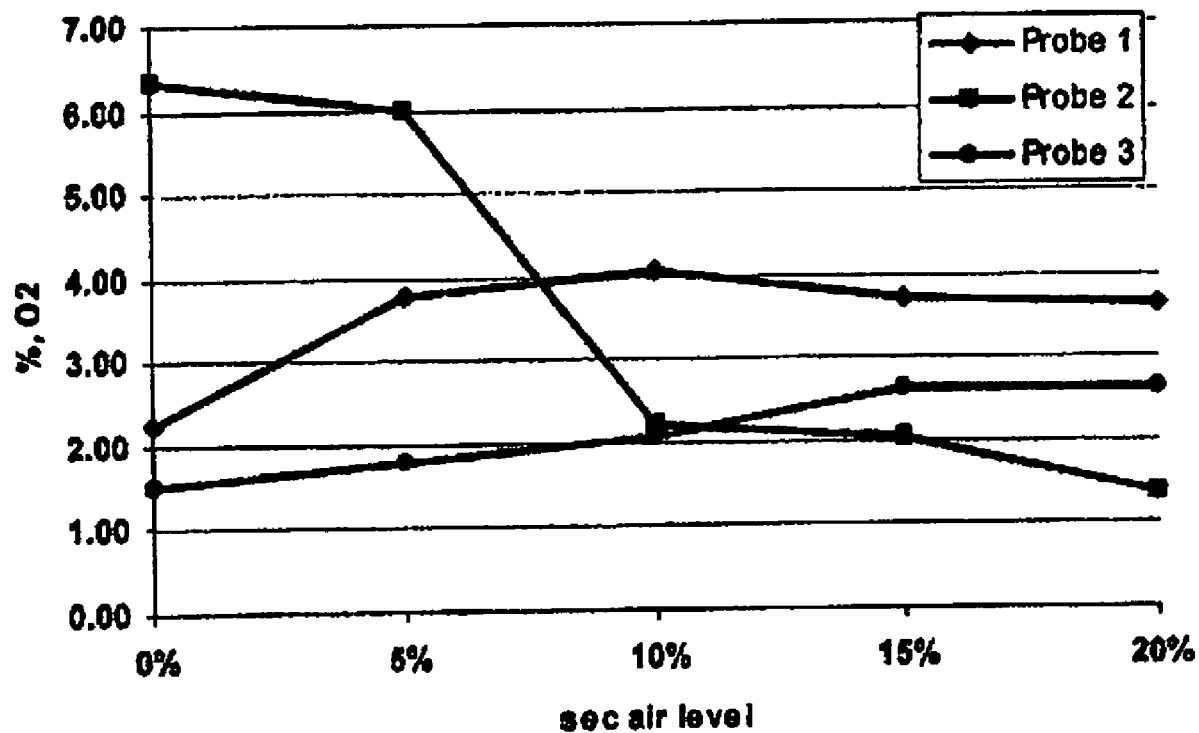
FIG. 10 is a diagram showing the oxygen content of the gases within a furnace chamber at the probe positions shown in FIG. 3 and at various amounts of secondary combustion oxidant resulting from implementation of a third embodiment of the method of this invention.
Figure 11:
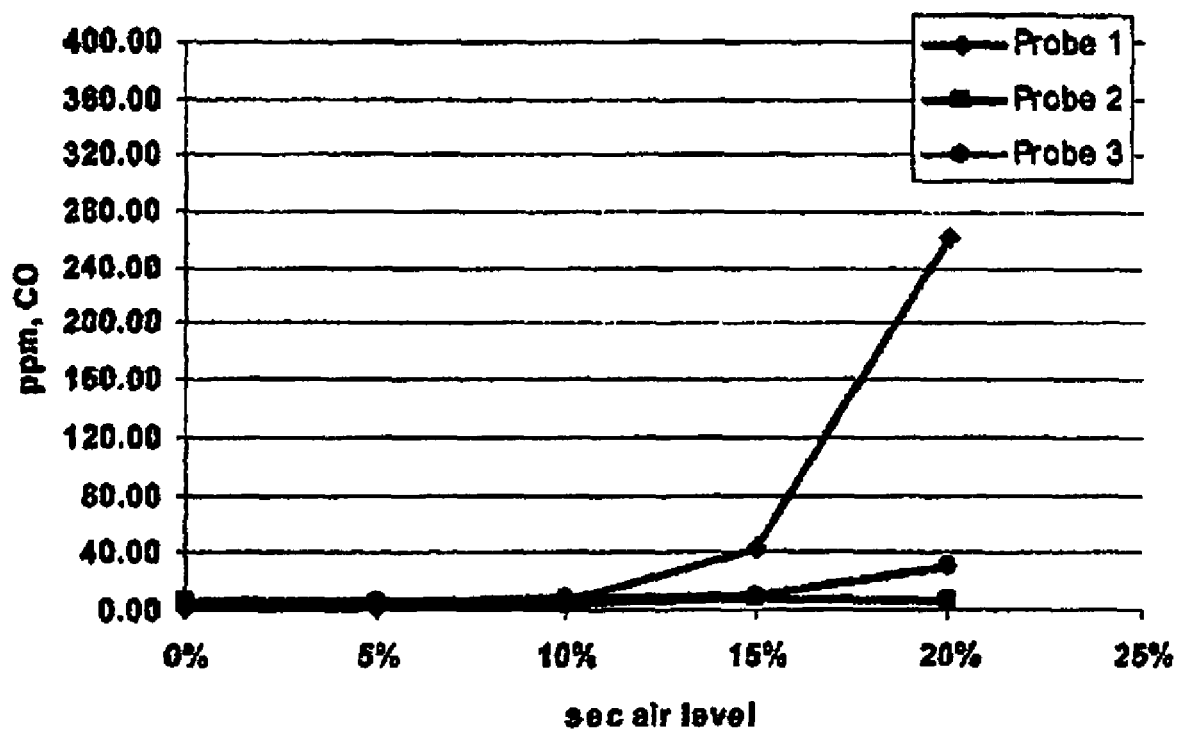
FIG. 11 is a diagram showing carbon monoxide content of the gases within a furnace chamber at the probe positions shown in FIG. 3 and at various amounts of secondary combustion oxidant resulting from implementation of a third embodiment of the method of this invention.
Figure 12:
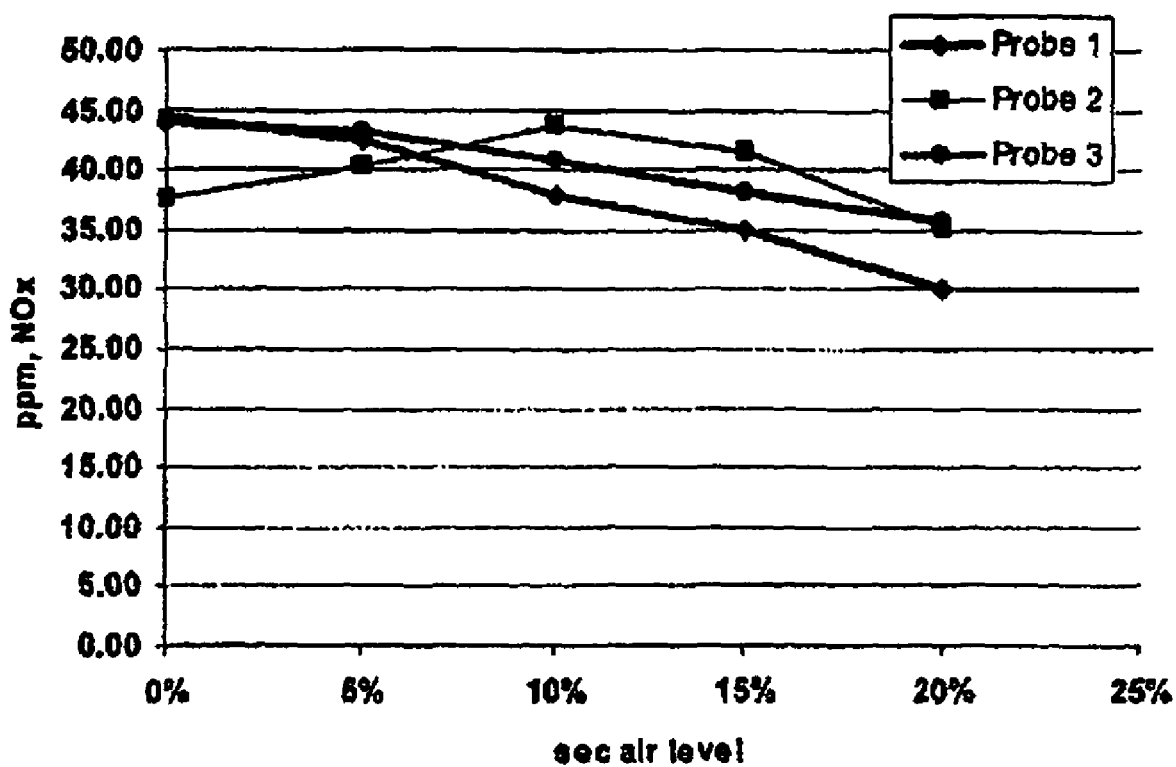
FIG. 12 is a diagram showing nitrogen oxides content of the gases within a furnace chamber at the probe positions shown in FIG. 3 and at various amounts of secondary combustion oxidant resulting from implementation of a third embodiment of the method of this invention.
Figure 13:
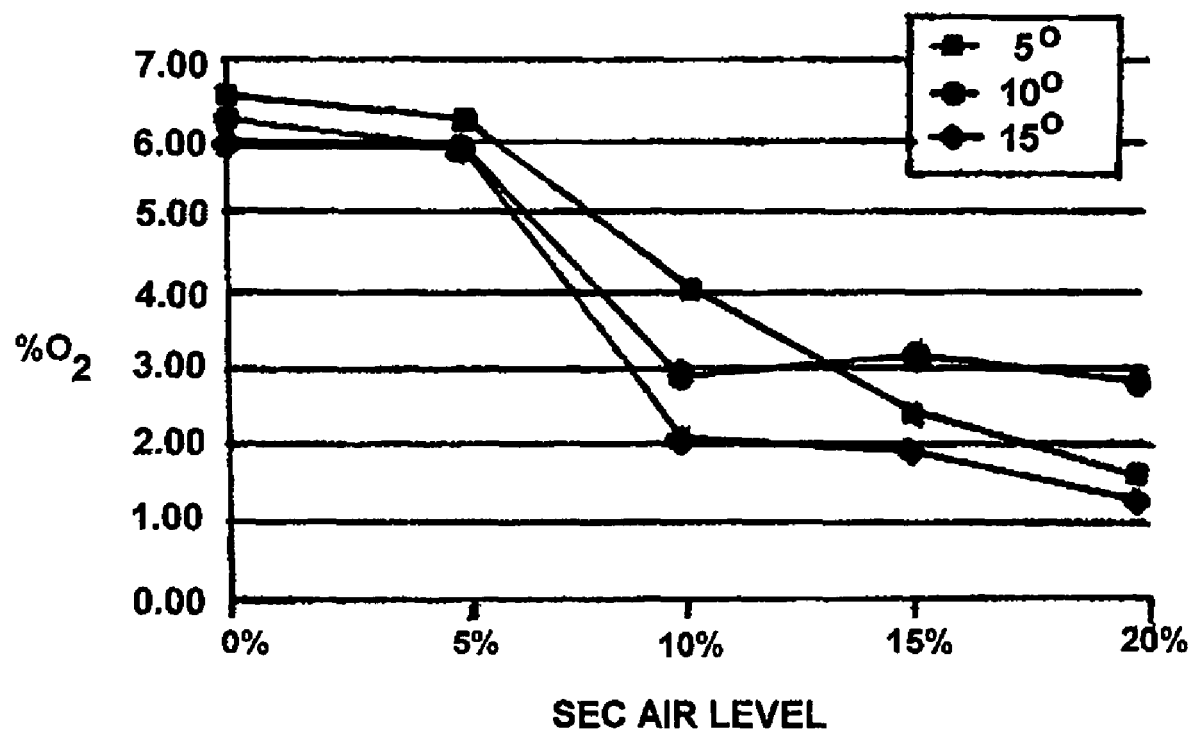
FIG. 13 is a diagram showing oxygen content of the gases within a furnace chamber at Probe 2 shown in FIG. 3 and at three different secondary combustion oxidant injection angles.

In addition to illustrating the hybrid flame produced in accordance with the method and apparatus of this invention, FIG. 3 also shows three probe locations, Probe 1, located above the flame and about ¼ of the way down the length of the furnace 25, Probe 2, located below the flame, about 2 inches above the furnace hearth and about ¼ of the way down the length of the furnace, and Probe 3, disposed at the outlet of the furnace, at which locations measurements of oxygen, $NO_x$, and CO concentrations were made to show the effects of implementation of a plurality of embodiments of the method of this invention. FIGS. 4, 7 and 10 show the oxygen concentration at each of these locations in a furnace operating at an overall 5% excess air level and a 0.8 MM Btu/hour firing rate with secondary combustion air being introduced into the furnace at angles of +5°, +10° and +15°, respectively, above a horizontal; FIGS. 5, 8 and 11 show the CO concentration at each of these locations in a furnace operating at an overall 5% excess air level and a 0.8 MM Btu/hour firing rate with secondary combustion air being introduced into the furnace at angles of +5°, +10° and +15°, respectively, above a horizontal; FIGS. 6, 9 and 12 show the $NO_x$ concentration at each of these locations in a furnace operating at an overall 5% excess air level and a 0.8 MM Btu/hour firing rate with secondary combustion air being introduced into the furnace at angles of +5°, +10° and +15°, respectively, above a horizontal; and FIG. 13 shows a composite of oxygen levels at Probe 2 at an overall 5% excess air level and a 0.8 MM Btu/hour firing rate with secondary combustion air injection angles of +5°, +10° and +15°.

The critical locations for maintaining fuel-rich conditions within the furnace chamber so as to limit metal oxidation and, in the case of aluminum, dross formation are between the bottom of the flame and the surface of the metal being heated. As can be seen most easily in FIG. 13, the oxygen level between the bottom of the flame and the surface of the metal being heated is significantly affected not only by the angle of injection of the secondary combustion oxidant into the furnace chamber, but also by the amount of secondary combustion oxidant introduced into the furnace chamber. At secondary combustion oxidant levels of about 0% to about 5% of the total amount of oxidant required for complete combustion of the fuel, the oxygen levels are relatively high, in the range of about 6-7% by volume. As the amount of secondary combustion oxidant introduced into the furnace chamber increases above about 5% of the total amount of oxidant required for complete combustion of the fuel, oxygen levels begin to decrease, resulting in oxygen levels of less than about 3% at secondary combustion oxidant levels of about 20% for all angles of injection.

FIGS. 4, 7 and 10 show that secondary combustion oxidant levels in the range of about 10% to about 20% of the total amount of fuel required for complete combustion of the fuel, oxygen levels in the furnace chamber above the flame as represented by Probe 1 are generally higher than the oxygen levels below the flame as represented by Probe 2. At secondary combustion oxidant levels of less than about 10%, the reverse is generally true. That is, oxygen levels below the flame are undesirably higher than the oxygen levels above the flame. Accordingly, to the extent that oxygen levels within the furnace chamber at the locations of interest are affected by the amount of secondary combustion oxidant introduced into the furnace chamber, the amount of secondary combustion oxidant introduced into the furnace chamber is preferably in the range of about 10% to about 20% of the total amount of oxidant required for complete combustion of the fuel.

FIGS. 5, 8 and 11 show the effect of secondary combustion oxidant injection angle on carbon monoxide levels generated in accordance with the method of this invention. As shown therein, carbon monoxide levels, which are an indicator of completeness of combustion, change at the higher amounts of secondary combustion oxidant injection with changes in injection angle. Thus, as the injection angle increases, the carbon monoxide level at the location of Probe 1 increases and the carbon monoxide levels at the locations of Probe 2 and Probe 3 decrease. The impact of injection angle on carbon monoxide levels in-the furnace-chamber can be reduced by reducing the amount of secondary combustion oxidant introduced into the furnace chamber. Accordingly, to the extent that carbon monoxide levels within the furnace chamber at the locations of interest are affected by the amount of secondary combustion oxidant introduced into the furnace chamber, the amount of secondary combustion oxidant introduced into the furnace chamber is preferably in the range of about 10% to about 15% of the total amount of oxidant required for complete combustion of the fuel.

FIGS., 6, 9 and 12 show the effect of secondary combustion oxidant injection angle on nitrogen oxide levels generated in accordance with the method of this invention. As can be seen, nitrogen oxide levels within the furnace chamber are generally unaffected by changes in the injection angle and the amount of secondary combustion oxidant introduced into the furnace chamber.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. In a furnace containing at least one of a metal and a metal alloy for one of heating and melting and having at least one burner nozzle generating a flame above said at least one of said metal and said metal alloy, said flame being generated by combination of a fuel and a primary combustion oxidant, a combustion method comprising the steps of:

introducing said fuel and said primary combustion oxidant into said furnace at a substoichiometric ratio, forming a fuel-rich said flame; and introducing a secondary combustion oxidant into said furnace substantially only above said flame in a manner whereby a lower portion of said flame proximate said at least one of said metal and said metal alloy is fuel-rich and an upper portion of said flame vertically distal from said at least one of said metal and said metal alloy is fuel-lean.

2. A method in accordance with claim 1, wherein said secondary combustion oxidant is introduced into said furnace in an amount up to about 30% of a total amount of oxidant required for complete combustion of said fuel.

3. A method in accordance with claim 1, wherein said fuel and said primary combustion oxidant are mixed prior to being introduced into said furnace.

4. A method in accordance with claim 1, wherein said secondary combustion oxidant is introduced into said furnace at an angle above horizontal in a range of about 0° to about 15° away from said flame above a centerline of said flame.

5. A method in accordance with claim 2, wherein said amount of secondary combustion oxidant is in a range of about 5% to about 30% of said total amount of oxidant.

6. A method in accordance with claim 1, wherein said secondary combustion oxidant is introduced into said furnace at a velocity that is one of greater than and equal to a fuel and primary combustion oxidant velocity.

7. A method in accordance with claim 1, wherein said secondary combustion oxidant is introduced into said furnace through a slotted nozzle oriented to produce a substantially horizontal oxidant plane substantially only above said flame.

8. A method in accordance with claim 1, wherein mixing of said secondary combustion oxidant into said flame is delayed for a distance corresponding to at least about one-half of a flame length of said flame.

* * * * *